(12) United States Patent
Xu et al.

(10) Patent No.: US 11,044,483 B2
(45) Date of Patent: Jun. 22, 2021

(54) METHODS AND APPARATUS FOR IMPROVED INTRA CHROMA ENCODING AND DECODING

(75) Inventors: Qian Xu, Folsom, CA (US); Yunfei Zheng, San Diego, CA (US); Xiaoan Lu, Princeton, NJ (US); Peng Yin, Ithaca, NY (US); Joel Sole, La Jolla, CA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 17 days.

(21) Appl. No.: 13/389,872

(22) PCT Filed: Aug. 11, 2010

(86) PCT No.: PCT/US2010/002203
§ 371 (c)(1),
(2), (4) Date: Feb. 10, 2012

(87) PCT Pub. No.: WO2011/019383
PCT Pub. Date: Feb. 17, 2011

(65) Prior Publication Data
US 2012/0140830 A1  Jun. 7, 2012

Related U.S. Application Data

(60) Provisional application No. 61/233,310, filed on Aug. 12, 2009.

(51) Int. Cl.
*H04N 19/00* (2014.01)
*H04N 19/186* (2014.01)
(Continued)

(52) U.S. Cl.
CPC ............. *H04N 19/186* (2014.11); *H04N 7/00* (2013.01); *H04N 19/11* (2014.11);
(Continued)

(58) Field of Classification Search
CPC .. H04N 7/12; H04N 7/26; H04N 7/00; H04N 19/00
See application file for complete search history.

(56) References Cited

U.S. PATENT DOCUMENTS

| 4,063,291 A | 12/1977 | Gennetten | |
|---|---|---|---|
| 2005/0053151 A1* | 3/2005 | Lin et al. | 375/240.18 |

(Continued)

FOREIGN PATENT DOCUMENTS

| CN | 1440053 | 9/2003 |
|---|---|---|
| CN | 1487474 | 4/2004 |

(Continued)

OTHER PUBLICATIONS

ITU-T H.264, Series H: Audiovisual and Multimedia Systems, Infrastructure of audiovisual services—Coding of moving video, "Advanced video coding for generic audiovisual services", Mar. 2005, pp. 1-343.

(Continued)

*Primary Examiner* — Maryam A Nasri
(74) *Attorney, Agent, or Firm* — Ronald Kolczynski

(57) ABSTRACT

Methods and apparatus are provided for improved chroma encoding and decoding. An apparatus includes an encoder for encoding picture data for at least a block in a picture. Multiple partition types are supported for intra chroma coding of the block. The multiple partition types include a set of chroma partition types and a set of luma partition types. The set of chroma partition types are different than the set of luma partition types.

21 Claims, 8 Drawing Sheets

(51) Int. Cl.
 *H04N 19/70* (2014.01)
 *H04N 19/147* (2014.01)
 *H04N 19/196* (2014.01)
 *H04N 19/463* (2014.01)
 *H04N 19/176* (2014.01)
 *H04N 19/46* (2014.01)
 *H04N 19/11* (2014.01)
 *H04N 7/00* (2011.01)

(52) U.S. Cl.
 CPC ......... *H04N 19/147* (2014.11); *H04N 19/176* (2014.11); *H04N 19/196* (2014.11); *H04N 19/46* (2014.11); *H04N 19/463* (2014.11); *H04N 19/70* (2014.11)

(56) References Cited

U.S. PATENT DOCUMENTS

| | | | |
|---|---|---|---|
| 2007/0121728 A1* | 5/2007 | Wang | H04N 19/563 375/240.18 |
| 2008/0219350 A1* | 9/2008 | Guo et al. | 375/240.15 |
| 2008/0219530 A1 | 9/2008 | Levanon et al. | |

FOREIGN PATENT DOCUMENTS

| | | |
|---|---|---|
| CN | 1585495 | 2/2005 |
| CN | 1784015 | 6/2006 |
| CN | 101222644 | 7/2008 |
| CN | 101438591 | 5/2009 |
| EP | 1513349 | 3/2005 |
| JP | 2005039743 | 2/2005 |
| JP | 2009177787 | 8/2009 |
| KR | 20060121651 | 11/2006 |
| KR | 20080006552 | 1/2008 |
| KR | 20090081878 | 7/2009 |
| WO | WO2006124885 | 11/2006 |

OTHER PUBLICATIONS

Lee, K. et al., "Technical Considerations for Ad Hoc Group on New Challenges in Video Coding Standardization", ISO/IEC JTC1/SC29/WG11, MPEG2008/M15580, Jul. 2008,Hannover,Germany.
Lim, S-C. et al., "Intra Coding Using Extended Block Size", Study Group 16, Question 6, 38th Meeting: London, UK/Geneva, CH, Jul. 1-8, 2009, Document VCEG-AL28.
"Video Coding Using Extended Block Sizes", COM 16-C 123-E, Jan. 2009, Study Group 16—Contribution 123.
International Search Report dated Sep. 28, 2011.

* cited by examiner

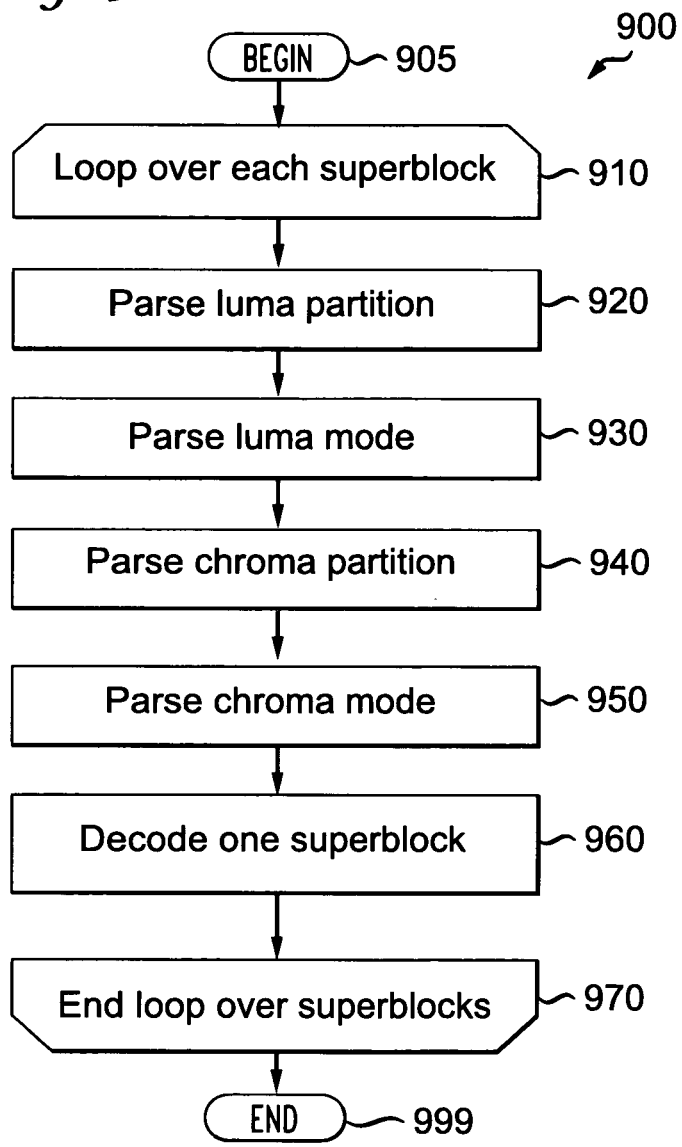

METHODS AND APPARATUS FOR IMPROVED INTRA CHROMA ENCODING AND DECODING

CROSS-REFERENCE TO RELATED APPLICATIONS

This application claims the benefit, under 35 U.S.C. § 365 of International Application PCT/US2010/002203 and filed Aug. 11, 2010, which was published in accordance with PCT Article 21(2) on Feb. 17, 2011, in English, and which claims the benefit of U.S. Provisional Patent Application No. 61/233,310, filed on Aug. 12, 2009, in English, which are incorporated by reference in their respective entireties.

TECHNICAL FIELD

The present principles relate generally to video encoding and decoding and, more particularly, to methods and apparatus for improved intra chroma encoding and decoding.

BACKGROUND

Most modern video coding standards employ various coding modes to efficiently reduce correlations in the spatial and temporal domains. In the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), a picture can be either intra or inter coded. In intra coded pictures, macroblocks (16×16) are coded in intra modes while exploiting spatial correlations in the picture. For intra luma coding, intra modes can be classified into the following three partition types: INTRA4×4; INTRA8×8; and INTRA16×16. INTRA4×4 uses a 4×4 discrete cosine transform (DCT). INTRA8×8 uses 8×8 transforms. INTRA16×16 uses a 4×4 integer DCT cascaded with a 4×4 direct current (DC) Hadamard transform. For intra chroma coding, only one partition type is allowed. Each 8×8 chroma component of an intra coded macroblock is predicted with 4 intra prediction modes and uses a 4×4 integer DCT cascaded with a 2×2 DC Hadamard transform. The chroma partition type is fixed no matter what the luma partition type is.

MPEG-4 AVC Standard Intra Coding

The MPEG-4 AVC Standard uses intra modes to exploit spatial correlations in the picture. For intra luma coding, intra modes can be classified into the following three types: INTRA4×4; INTRA8×8; and INTRA16×16. INTRA4×4 and INTRA8×8 support 9 intra prediction modes and INTRA16×16 supports 4 intra prediction modes. Turning to FIG. 1, INTRA4×4 and INTRA8×8 prediction modes are indicated generally by the reference numeral 100. In FIG. 1, the reference numeral 0 indicates a vertical prediction mode, the reference numeral 1 indicates a horizontal prediction mode, the reference numeral 3 indicates a diagonal-down/left prediction mode, the reference numeral 4 indicates a diagonal-down/right prediction mode, the reference numeral 5 indicates a vertical-right prediction mode, the reference numeral 6 indicates a horizontal-down prediction mode, the reference numeral 7 indicates a vertical-left prediction mode, and the reference numeral 8 indicates a horizontal-up prediction mode. DC mode, which is part of the INTRA4×4 and INTRA8×8 prediction modes, is not shown. Turning to FIG. 2, INTRA16×16 prediction modes are indicated generally by the reference numeral 200. In FIG. 2, the reference numeral 0 indicates a vertical prediction mode, the reference numeral 1 indicates a horizontal prediction mode, and the reference numeral 3 indicates a plane prediction mode. DC mode, which is part of the INTRA16×16 prediction modes, is not shown.

Since the basic coding unit in the MPEG-4 AVC Standard is a macroblock, that is, the size is 16×16, the partition types inside a macroblock are either all 16×16, 8×8 or 4×4. There are no mixed partition types inside a macroblock, as shown in FIG. 3. Turning to FIG. 3, motion partitions for use in intra 16×16 blocks 310 are indicated generally by the reference numeral 300. The partitions include 16×16, 8×8, and 4×4 partitions.

As noted above, INTRA4×4 uses a 4×4 DCT transform, INTRA8×8 uses 8×8 transforms, and INTRA16×16 uses cascaded 4×4 transforms. For signaling, INTRA4×4 and INTRA8×8 share the same macroblock type (mb_type) 0 and they are differentiated by a transform size flag (transform_8x8_size_flag). Then the choice of intra prediction mode in INTRA4×4 or INTRA8×8 is signaled by the most probably mode possibly with a remaining mode if necessary. For INTRA16×16, all the intra prediction modes along with the coded block pattern (cbp) type are signaled in mb_type, which uses an mb_type value from 1 to 24. For intra chroma coding, each 8×8 chroma component of an intra coded macroblock is predicted using 4 intra prediction modes and using a 4×4 integer DCT cascaded with a 2×2 DC Hadamard transform. Intra chroma coding is fixed independent of a luma partition type. Intra chroma coding does not adapt to the content, thus reducing the fidelity of chroma coding.

In the 4:4:4 case in the MPEG-4 AVC Standard, intra luma partition types and prediction modes can be used for all three color components. Common mode and independent mode are supported. In common mode, all three components share the exact same information as the luma component, including partition type and prediction modes. In independent mode, each of the three color components are coded as a separate plane, using the same coding method as the luma plane.

Large Intra Partitions in MPEG-4 AVC Standard Extensions

In a first prior art approach, the prediction block unit is extended for intra coding by increasing the number of intra direction modes to more than 9. However, in the first prior art approach, there is no mentioning or contemplation for the chroma case. In a second prior at approach, the chroma partition type is fixed to be Chroma_8×8, the same as in the MPEG-4 AVC Standard. For intra prediction modes and transforms, the chroma partition type is kept the same as luma intra_16×16, intra_8×8 and intra_4×4 in the MPEG-4 AVC Standard, i.e., using 4 chroma prediction modes and a cascaded 4×4 transform. For intra_32×32, chroma uses 4 chroma prediction modes and a cascaded 8×8 transform, as shown in TABLE 1. That is, TABLE 1 shows prediction partition sizes and transforms used for each intra prediction mode for the 4:2:0 format. The scheme used in the second prior art approach does have several disadvantages. One disadvantage of the second prior art approach is that the chroma coding partition type is fixed for all the luma partition types. Another disadvantage of the second prior art approach is that the selected coding mode or transform for chroma coding is not the best. Yet another disadvantage of the second prior art approach is that the chroma coding has little flexibility.

TABLE 1

| Macroblock luma partition | Luma transform | Chroma transform (with 8x8 partition) |
|---|---|---|
| Intra_32x32 | 8x8 integer cosine transform, and then 4x4 Hadamard transform | 8x8 integer cosine transform, and then 2x2 Hadamard transform |
| Modified Intra_16x16 | 16x16 integer cosine transform in KTA 2.3 [1] | 4x4 integer cosine transform, and then 2x2 Hadamard transform |
| Intra_8x8 | 8x8 integer cosine transform | 4x4 integer cosine transform, and then 2x2 Hadamard transform |
| Intra_4x4 | 4x4 integer cosine transform | 4x4 integer cosine transform, and then 2x2 Hadamard transform |

SUMMARY

These and other drawbacks and disadvantages of the prior art are addressed by the present principles, which are directed to methods and apparatus for improved chroma encoding and decoding.

According to an aspect of the present principles, there is provided an apparatus. The apparatus includes an encoder for encoding picture data for at least a block in a picture. Multiple partition types are supported for intra chroma coding of the block. The multiple partition types include a set of chroma partition types and a set of luma partition types. The set of chroma partition types are different than the set of luma partition types.

According to another aspect of the present principles, there is provided a method in a video encoder. The method includes encoding picture data for at least a block in a picture. Multiple partition types are supported for intra chroma coding of the block. The multiple partition types include a set of chroma partition types and a set of luma partition types. The set of chroma partition types are different than the set of luma partition types.

According to yet another aspect of the present principles, there is provided an apparatus. The apparatus includes a decoder for decoding picture data for at least a block in a picture. Multiple partition types are supported for intra chroma decoding of the block. The multiple partition types include a set of chroma partition types and a set of luma partition types. The set of chroma partition types are different than the set of luma partition types.

According to a further aspect of the present principles, there is provided a method in a video decoder. The method includes decoding picture data for at least a block in a picture. Multiple partition types are supported for intra chroma decoding of the block. The multiple partition types include a set of chroma partition types and a set of luma partition types. The set of chroma partition types are different than the set of luma partition types.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 9 is a flow diagram showing another exemplary method for intra chroma decoding, in accordance with an embodiment of the present principles.

DETAILED DESCRIPTION

Figure 1:
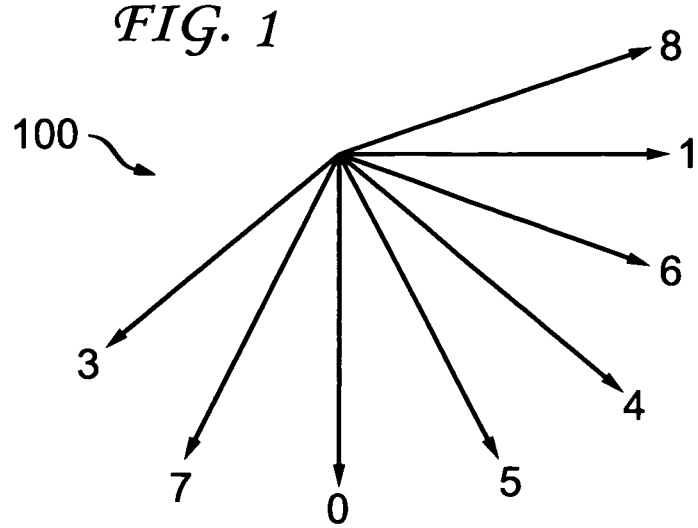
FIG. 1 is a diagram showing INTRA4×4 and INTRA8×8 prediction modes to which the present principles may be applied.
Figure 2:
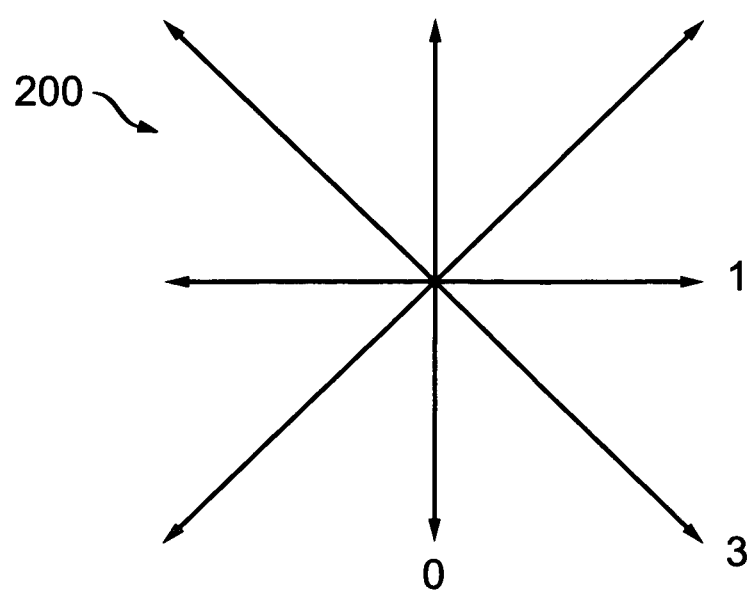
FIG. 2 is a diagram showing INTRA16×16 prediction modes to which the present principles may be applied.
Figure 3:
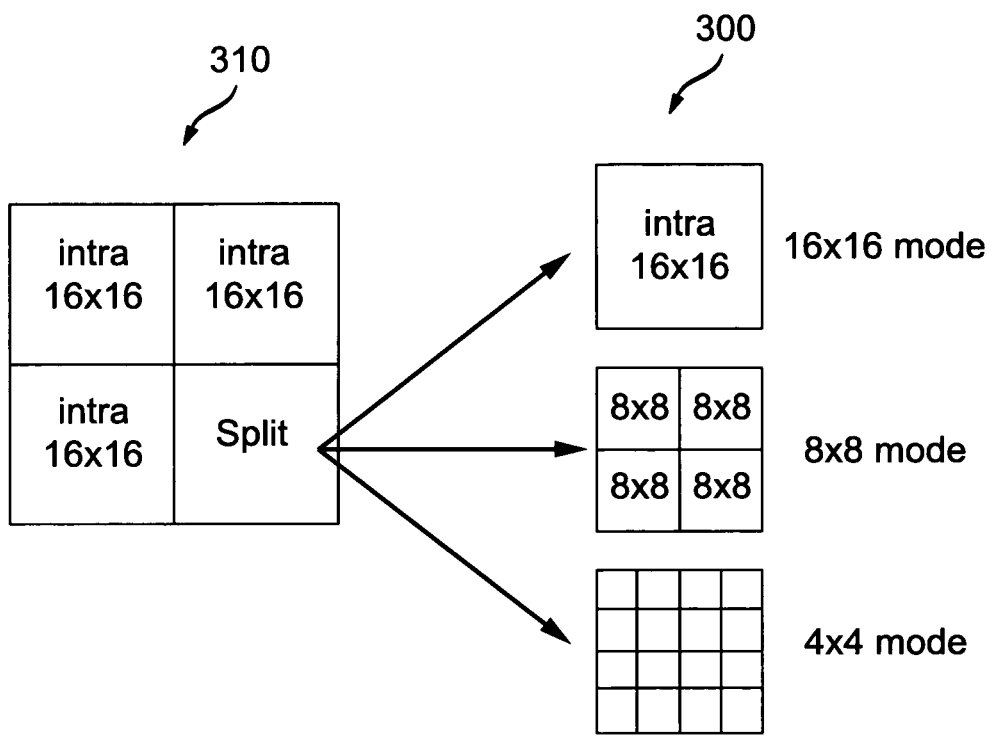
FIG. 3 is a diagram showing motion partitions for use in 16×16 blocks to which the present principles may be applied.

The present principles are directed to methods and apparatus for improved intra chroma encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller"

should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, as used herein, the words "picture" and "image" are used interchangeably and refer to a still image or a picture from a video sequence. As is known, a picture may be a frame or a field.

Further, as used herein, the word "signal" refers to indicating something to a corresponding decoder. For example, the encoder may signal a particular partition type and/or partition mode for chroma coding in order to make the decoder aware of which particular partition type and/or partition mode was used on the encoder side. In this way, the same function may be used at both the encoder side and the decoder side. Thus, for example, an encoder may transmit a particular partition type and/or partition mode to the decoder so that the decoder may use the same particular partition type and/or partition mode or, if the decoder already has the particular partition type and/or partition mode as well as others, then signaling may be used (without transmitting) to simply allow the decoder to know and select the particular partition type and/or partition mode. By avoiding transmission of any actual partition types and/or partition modes, a bit savings may be realized. It is to be appreciated that signaling may be accomplished in a variety of ways. For example, one or more syntax elements, flags, and so forth may be used to signal information to a corresponding decoder.

Also, as used herein, the word "superblock" refers to one or more macroblocks.

Additionally, as used herein, the phrase "multiple partition types are supported for intra chroma coding" refers to the case where the partition type for intra chroma coding is not fixed to one particular partition type, but rather a selection is made with respect to a set of multiple partition types for intra chroma coding and where the set of multiple partition types for intra chroma coding differs from a set of multiple partition types of intra luma coding that is also available for coding.

Moreover, it is to be appreciated that while one or more embodiments of the present principles are described herein with respect to the MPEG-4 AVC Standard, the present principles are not limited to solely this standard and, thus, may be utilized with respect to other video coding standards, recommendations, and extensions thereof, including extensions of the MPEG-4 AVC standard, while maintaining the spirit of the present principles.

Figure 4:
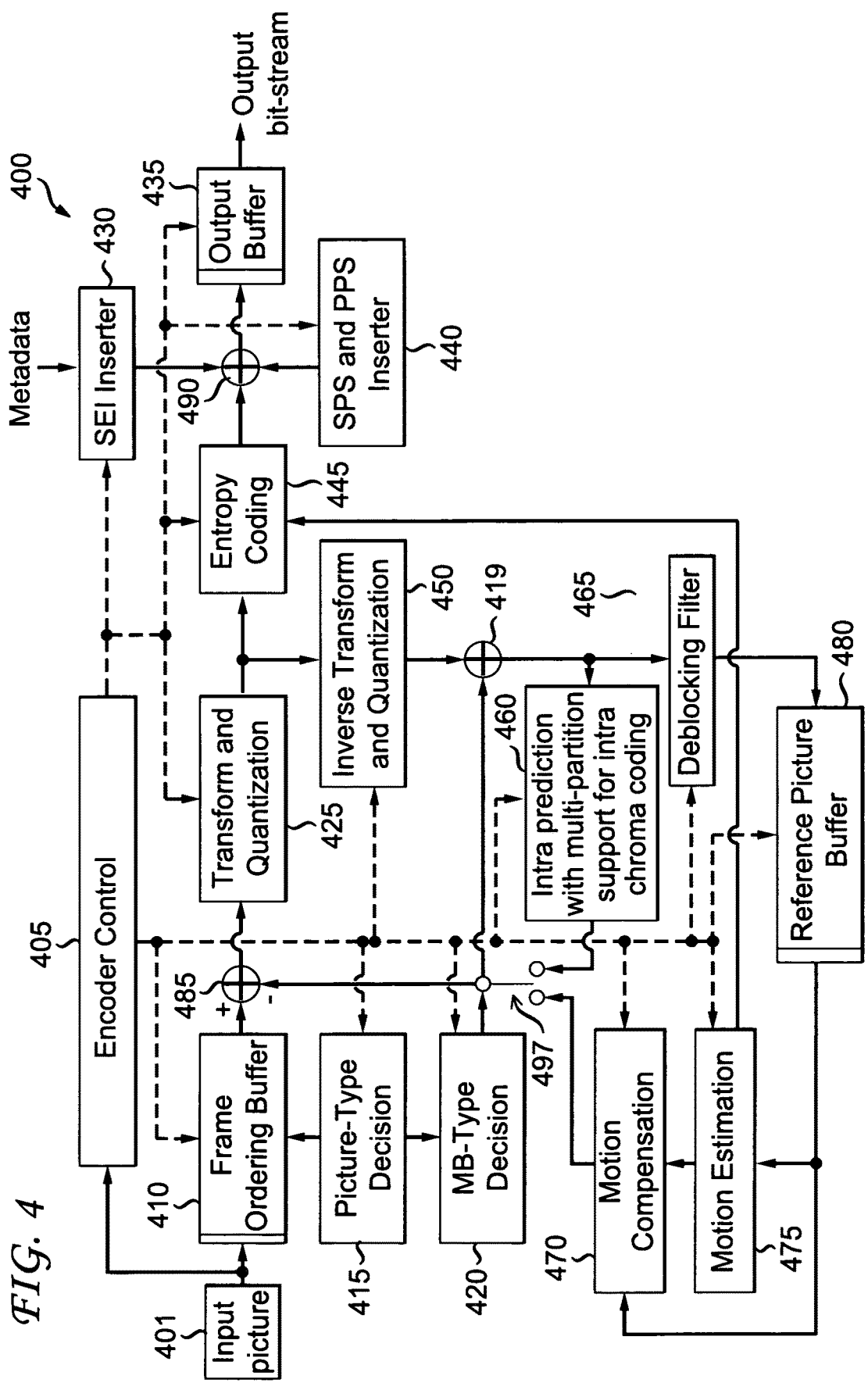
FIG. 4 is a block diagram showing an exemplary video encoder to which the present principles may be applied in accordance with an embodiment of the present principles.

Turning to FIG. 4, an exemplary video encoder to which the present principles may be applied is indicated generally by the reference numeral 400.

The video encoder 400 includes a frame ordering buffer 410 having an output in signal communication with a non-inverting input of a combiner 485. An output of the combiner 485 is connected in signal communication with a first input of a transformer and quantizer 425. An output of the transformer and quantizer 425 is connected in signal communication with a first input of an entropy coder 445 and a first input of an inverse transformer and inverse quantizer 450. An output of the entropy coder 445 is connected in signal communication with a first non-inverting input of a combiner 490. An output of the combiner 490 is connected in signal communication with a first input of an output buffer 435.

A first output of an encoder controller 405 is connected in signal communication with a second input of the frame ordering buffer 410, a second input of the inverse transformer and inverse quantizer 450, an input of a picture-type decision module 415, a first input of a macroblock-type (MB-type) decision module 420, a second input of an intra prediction module with multi-partition support for chroma coding 460, a second input of a deblocking filter 465, a first input of a motion compensator 470, a first input of a motion estimator 475, and a second input of a reference picture buffer 480.

A second output of the encoder controller 405 is connected in signal communication with a first input of a Supplemental Enhancement Information (SEI) inserter 430, a second input of the transformer and quantizer 425, a second input of the entropy coder 445, a second input of the output buffer 435, and an input of the Sequence Parameter Set (SPS) and Picture Parameter Set (PPS) inserter 440.

An output of the SEI inserter 430 is connected in signal communication with a second non-inverting input of the combiner 490.

A first output of the picture-type decision module 415 is connected in signal communication with a third input of the frame ordering buffer 410. A second output of the picture-type decision module 415 is connected in signal communication with a second input of a macroblock-type decision module 420.

An output of the Sequence Parameter Set (SPS) and Picture Parameter Set (PPS) inserter 440 is connected in signal communication with a third non-inverting input of the combiner 490.

An output of the inverse quantizer and inverse transformer 450 is connected in signal communication with a first non-inverting input of a combiner 419. An output of the combiner 419 is connected in signal communication with a first input of the intra prediction module with multi-partition support for chroma coding 460 and a first input of the deblocking filter 465. An output of the deblocking filter 465 is connected in signal communication with a first input of a reference picture buffer 480. An output of the reference picture buffer 480 is connected in signal communication with a second input of the motion estimator 475 and a third input of the motion compensator 470. A first output of the motion estimator 475 is connected in signal communication with a second input of the motion compensator 470. A second output of the motion estimator 475 is connected in signal communication with a third input of the entropy coder 445.

An output of the motion compensator 470 is connected in signal communication with a first input of a switch 497. An output of the intra prediction module with multi-partition support for chroma coding 460 is connected in signal communication with a second input of the switch 497. An output of the macroblock-type decision module 420 is connected in signal communication with a third input of the switch 497. The third input of the switch 497 determines whether or not the "data" input of the switch (as compared to the control input, i.e., the third input) is to be provided by the motion compensator 470 or the intra prediction module with multi-partition support for chroma coding 460. The output of the switch 497 is connected in signal communication with a second non-inverting input of the combiner 419 and an inverting input of the combiner 485.

A first input of the frame ordering buffer 410 and an input of the encoder controller 405 are available as inputs of the encoder 400, for receiving an input picture 401. Moreover, a second input of the Supplemental Enhancement Information (SEI) inserter 430 is available as an input of the encoder 400, for receiving metadata. An output of the output buffer 435 is available as an output of the encoder 400, for outputting a bitstream.

Figure 5:
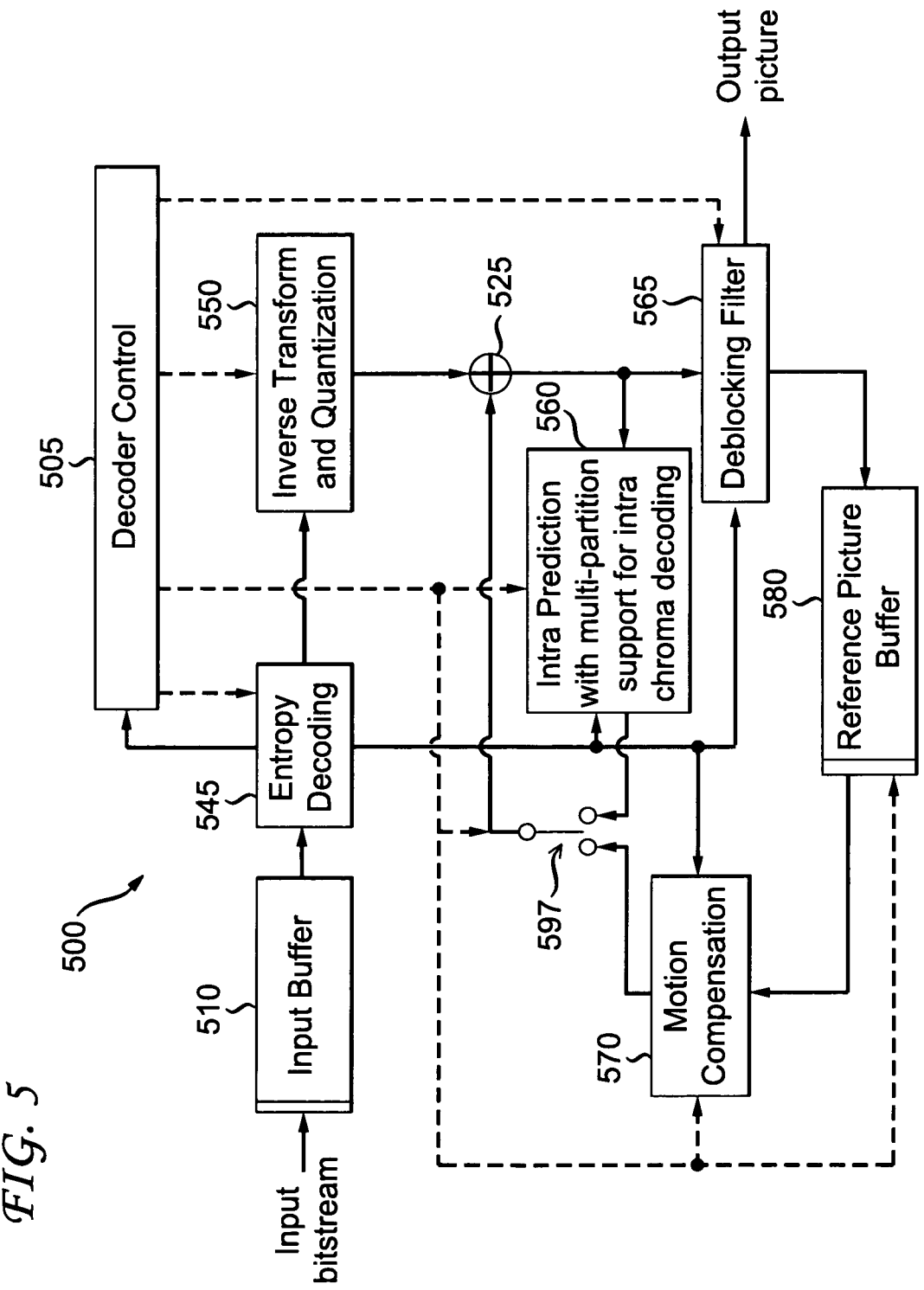
FIG. 5 is a block diagram showing an exemplary video decoder to which the present principles may be applied in accordance with an embodiment of the present principles.

Turning to FIG. 5, an exemplary video decoder to which the present principles may be applied is indicated generally by the reference numeral 500.

The video decoder 500 includes an input buffer 510 having an output connected in signal communication with a first input of an entropy decoder 545. A first output of the entropy decoder 545 is connected in signal communication with a first input of an inverse transformer and inverse quantizer 550. An output of the inverse transformer and inverse quantizer 550 is connected in signal communication with a second non-inverting input of a combiner 525. An output of the combiner 525 is connected in signal communication with a second input of a deblocking filter 565 and a first input of an intra prediction module with multi-partition support for chroma decoding 560. A second output of the deblocking filter 565 is connected in signal communication with a first input of a reference picture buffer 580. An output of the reference picture buffer 580 is connected in signal communication with a second input of a motion compensator 570.

A second output of the entropy decoder 545 is connected in signal communication with a third input of the motion compensator 570, a first input of the deblocking filter 565, and a third input of the intra predictor with multi-partition support for chroma decoding 560. A third output of the entropy decoder 545 is connected in signal communication with an input of a decoder controller 505. A first output of the decoder controller 505 is connected in signal communication with a second input of the entropy decoder 545. A second output of the decoder controller 505 is connected in signal communication with a second input of the inverse transformer and inverse quantizer 550. A third output of the decoder controller 505 is connected in signal communication with a third input of the deblocking filter 565. A fourth output of the decoder controller 505 is connected in signal communication with a second input of the intra prediction module with multi-partition support for chroma decoding 560, a first input of the motion compensator 570, and a second input of the reference picture buffer 580.

An output of the motion compensator 570 is connected in signal communication with a first input of a switch 597. An output of the intra prediction module with multi-partition support for chroma decoding 560 is connected in signal communication with a second input of the switch 597. An output of the switch 597 is connected in signal communication with a first non-inverting input of the combiner 525.

An input of the input buffer 510 is available as an input of the decoder 500, for receiving an input bitstream. A first output of the deblocking filter 565 is available as an output of the decoder 500, for outputting an output picture.

With respect to encoder 400, intra predictor with multi-partition support for chroma coding 460 is configured to perform improved intra chroma coding in accordance with one or more embodiments of the present principles. With respect to decoder 500, intra predictor with multi-partition support for chroma decoding 560 is configured to perform improved intra chroma decoding in accordance with one or more embodiments of the present principles.

As noted above, the present principles are directed to improved intra chroma coding and decoding. Moreover, as noted above with respect to the prior art, only one partition type is allowed for intra chroma coding. Each 8×8 chroma component of an intra coded macroblock is predicted with 4 intra prediction modes and uses a 4×4 integer DCT cascaded with a 2×2 DC Hadamard transform. The chroma partition type is fixed no matter what the luma partition type is. Therefore, we have recognized an opportunity for improvement, and have developed an improved coding efficiency approach for intra chroma coding. One or more embodiments of the present principles are particularly effective for large intra partition types.

As noted above, although one or more embodiments may refer to the MPEG-4 AVC Standard for the sake of illustration, it is to be appreciated that the present principles are not limited solely to the same and, thus, may be used with other video coding standards, recommendations, extensions thereof, and so forth, while maintaining the spirit of the present principles. Moreover, it is to be appreciated that although one or more embodiments may be described with respect to the 4:2:0 format of the MPEG-4 AVC Standard for the sake of illustration, the present principles are not limited solely to the preceding and, thus, may be applied to other formats including, but not limited to, the 4:2:2 or 4:4:4 formats of the MPEG-4 AVC Standard or other formats of other standards, recommendations, and/or extensions thereof, while maintaining the spirit of the present principles. Rather, a particular aspect common to the embodiments involves the enablement of multiple partition types for intra chroma coding.

Method 1

In accordance with a first exemplary method, also interchangeably referred to herein as Method 1, the chroma partition type is determined by luma partition type. However, unlike the second prior art approach, the chroma partition type is aligned with the luma partition type for a predefined set of partition types. For example, if the luma partition type is 8×8, then the chroma partition type for the 4:2:0 format will be 4×4 instead of 8×8 chroma as is done in the second prior art approach. This is because the size of chroma is ½ of luma. With regard to the transform, for each chroma partition type, we select the largest-size available transform that matches the partition type from a predefined transform set. If the largest-size available transform is smaller than the partition type, then we can apply a Hadamard transform on the DC coefficients which we generally call a cascaded transform. We do not put any constraint on the luma and chroma intra prediction modes inside the partition type. The luma and chroma intra prediction modes can be the same or different. As for the signaling, we only signal the luma partition type, but not the chroma partition type, since the chroma partition type is decided based on the luma partition type. The luma partition type can be absolutely coded or differentially coded from the neighboring block.

Embodiment 1

We now described an exemplary embodiment (hereinafter "Embodiment 1") of method 1. We presume the superblock size is 32×32. We define Luma_Partition_Type={Luma_32×32, Luma_16×16, Luma_8×8, Luma_4×4}, Chroma_Partition_Type={Chroma_16×16, Chroma_8×8, Chroma_4×4}, and DCT_Transform_Size={16×16, 8×8, 4×4}. Then, based on the present principles, we set our basic coding block unit to be 8×8, with the detailed mapping between luma_partition_type and chroma_partition_type and the corresponding transform shown in TABLE 2. That is, TABLE 2 shows prediction partition size and transforms used for intra coding for the 4:2:0 format, in accordance with an embodiment of the present principles. When performing encoding inside a superblock, we loop over all luma partition types, and perform a mode decision on the luma component and select the best luma_partition_type and luma intra prediction mode. Then the chroma partition type is decided based on the best luma_partition_type and the best chroma intra prediction mode is selected. We only signal luma_partition_type, luma mode and chroma mode. At the decoder, we only parse luma_partition_type, luma mode and chroma mode.

TABLE 2

| Luma partition type and transform | Chroma partition type and transform |
|---|---|
| Luma_32×32 and 16×16 DCT cascaded with 2x2 Hadamard transform | Chroma_16×16 and 16×16 DCT |
| Luma_16×16 and 16×16 DCT | Chroma_8×8 and 8×8 DCT |
| Luma_8×8 and 8×8 DCT | Chroma_4×4 and 4×4 DCT |
| Luma_4×4 and 4×4 DCT | Chroma_4×4 and 4×4 DCT |

Figure 6:
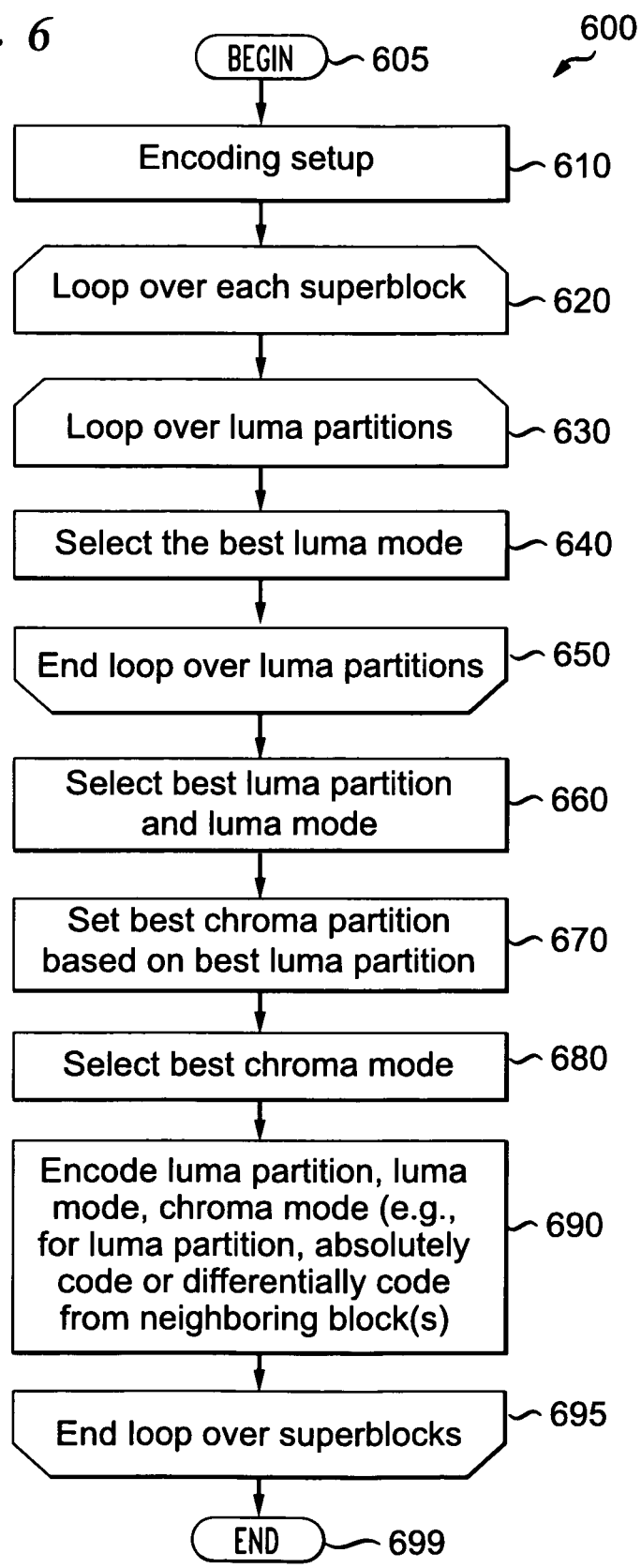
FIG. 6 is a flow diagram showing an exemplary method for intra chroma coding, in accordance with an embodiment of the present principles.

Turning to FIG. 6, an exemplary method for intra chroma coding is indicated generally by the reference numeral 600. The method 600 corresponds to one implementation of Embodiment 1 described above. The method 600 includes a start block 605 that passes control to a function block 610. The function block 610 performs an encoding setup, and passes control to a loop limit block 620. The loop limit block 620 begins a loop over each superblock, and passes control to a loop limit block 630. The loop limit block 630 begins a loop over luma partitions, and passes control to a function block 640. The function block 640 selects the best luma mode (based on, e.g., a rate-distortion cost), and passes control to a loop limit block 650. The loop limit block 650 ends the loop over the luma partitions, and passes control to a function block 660. The function block 660 sets the best luma partition and luma mode (based on, e.g., a rate-distortion cost), and passes control to a function block 670. The function block 670 sets the best chroma partition based on the best luma partition, and passes control to a function block 680. The function block 680 selects the best chroma mode, and passes control to a function block 690. The function block 690 encodes the luma partition, the luma mode, and the chroma mode, and passes control to a loop limit block 695. The loop limit block 695 ends the loop over the superblocks, and passes control to an end block 699. With respect to function block 690, the luma partition may be absolutely coded or may be differentially coded from one or more neighboring blocks.

Figure 7:
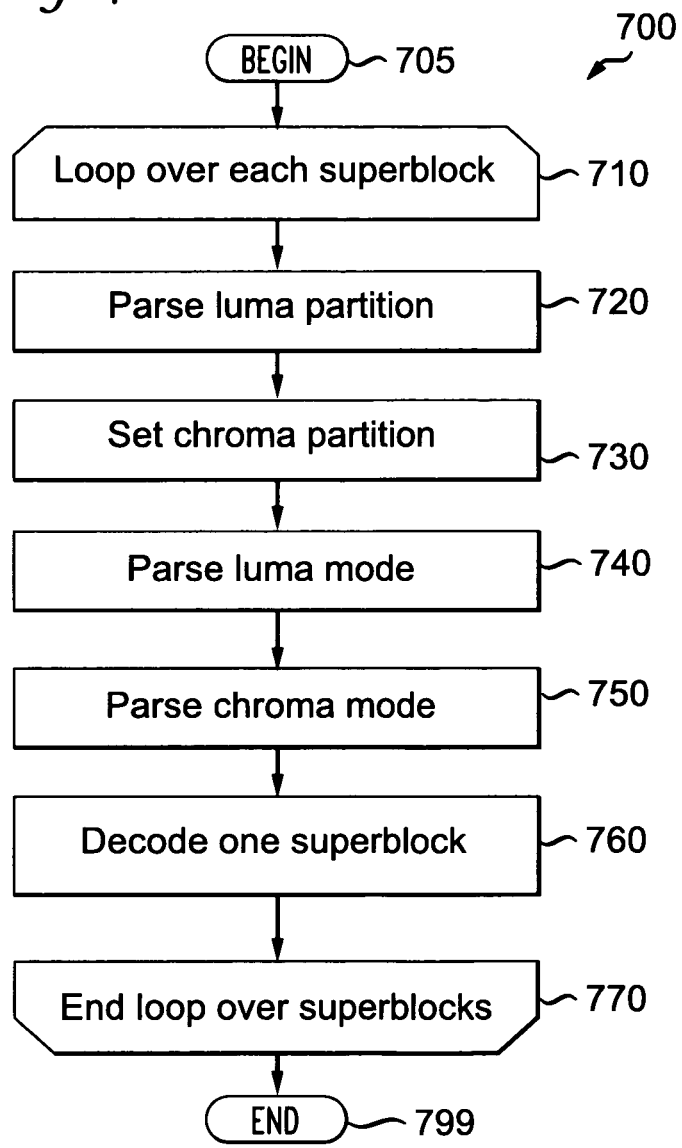
FIG. 7 is a flow diagram showing an exemplary method for intra chroma decoding, in accordance with an embodiment of the present principles.

Turning to FIG. 7, an exemplary method for intra chroma decoding is indicated generally by the reference numeral 700. The method 700 corresponds to one implementation of Embodiment 1 described above. The method 700 includes a start block 705 that passes control to a loop limit block 710. The loop limit block 710 begins a loop over each superblock, and passes control to a function block 720. The function block 720 parses a luma partition, and passes control to a function block 730. The function block 730 sets a chroma partition (based on the luma partition parsed by function block 720), and passes control to a function block 740. The function block 740 parses a luma mode, and passes control to a function block 750. The function block 750 parses a chroma mode, and passes control to a function block 760. The function block 760 decodes one superblock (using the items parsed/set by function blocks 720, 730, 740, and 750), and passes control to a loop limit block 770. The loop limit block 770 ends the loop over the superblocks, and passes control to an end block 799.

Syntax 1

TABLE 3 shows exemplary macroblock layer syntax for Embodiment 1, in accordance with an embodiment of the present principles.

TABLE 3

| macroblock_layer( ) { | C | Descriptor |
|---|---|---|
| ... | | |
|   intra32_flag | 2 | u(1) |
|   if (intra32_flag==1) { | | |
|     intra_luma_pred_mode_32 | 2 | ue(v)/se(v) |
|     intra_chroma_pred_mode_16 | 2 | ue(v)/se(v) |
|   } | | |
|   else { | | |
|     for (i16=0; i16<4; i16++) { | | |
|       sip_type_16[i16] | 2 | ue(v)/se(v) |
|       if (sip_type_16[i16]==Luma_16x16) { | | |
|         intra_luma_pred_mode_16[i16] | 2 | ue(v)/se(v) |
|         intra_chroma_pred_mode_8[i16] | 2 | ue(v)/se(v) |
|       } | | |
|       else { | | |
|         if (sip_type[i16]==Luma_8x8) { | | |
|           for (i8=0; i8<4; i8++) | | |
|             intra_luma_pred_mode_8[i8] | 2 | ue(v)/se(v) |
|         } | | |
|         else { | | |
|           for (i4=0; i4<16; i4++) | | |
|             intra_luma_pred_mode_4[i4] | 2 | ue(v)/se(v) |
|         } | | |
|         for (i8=0; i8<4; i8++) | | |
|           intra_chroma_pred_mod_4[i8] | 2 | ue(v)/se(v) |
|       } | | |
|     } | | |
|   } | | |
|   ... | | |
| } | | |

The semantics of the syntax elements of TABLE 3 are as follows:

intra32_flag equal to 1 specifies that Luma_32×32 is used for a 32×32 large block. Intra32_flag equal to 0 specifies that a 32×32 large block is further split into 16×16 partitions.

intra_luma_pred_mode_32 specifies intra prediction mode for Luma_32×32.

intra_chroma_pred_mode_16 specifies intra prediction mode for Chroma_16×16.

sip_type_16[i] specifies the spatial intra partition type in the $i^{th}$ 16×16 luma block. The spatial intra partition type can be Luma_16×16, Luma_8×8 and Luma_4×4.

intra_luma_pred_mode_16[i] specifies the intra prediction mode for Luma_16×16 for the $i^{th}$ 16×16 luma block.

intra_chroma_pred_mode_8[i] specifies the intra prediction mode for Chroma_8×8 for the $i^{th}$ 16×16 luma block.

intra_luma_pred_mode_8[i] specifies the intra prediction mode for Luma_8×8 for the $i^{th}$ 8×8 luma block.

intra_luma_pred_mode_4[i] specifies the intra prediction mode for Luma_4×4 for the $i^{th}$ 4×4 luma block.

intra_chroma_pred_mode_4[i] specifies the intra prediction mode for Chroma_4×4 for the $i^{th}$ 8×8 luma block.

Method 2

In a second method, also interchangeably referred to herein as Method 2, intra luma partition type and chroma partition type are independently coded inside a macroblock (MB) or a superblock. The difference from 4:4:4 separate mode in the MPEG-4 AVC Standard is that the decision is made on a macroblock/superblock basis instead of slice basis and luma and chroma can have different intra prediction modes. The difference from the MPEG-4 AVC Standard for other profiles is that the MPEG-4 AVC Standard only allows one chroma partition type, but in our embodiment, we allow a set of chroma partition types. The transform selection rule is the same as per Method 1. For the signaling, we signal the luma partition type and the chroma partition type, as well as the luma modes and the chroma modes. The luma partition type and chroma partition type can be absolutely coded or differentially coded from a neighboring block. Alternatively, the chroma partition type can be differentially coded from the luma partition type. Chroma can use the same or a different entropy coding engine as luma.

Embodiment 2

We now described an exemplary embodiment (hereinafter "Embodiment 2") of method 2. We presume the superblock size is 32×32. We define Luma_Partition_Type={Luma_32×32, Luma_16×16, Luma_8×8, Luma_4×4}, Chroma_Partition_Type={Chroma_16×16, Chroma_8×8, Chroma_4×4}, DCT_Transform_Size={16×16, 8×8, 4×4}. When performing encoding inside a superblock, we encode the luma component first, trying all possible luma partition types and corresponding prediction modes, and then select the best luma partition type and mode. Then we encode the chroma components, trying all possible chroma partition types and corresponding prediction modes, and then select the best chroma partition type and mode. We encode both luma and chroma partition types. At the decoder side, we parse the syntax of both the luma and chroma partition types.

Figure 8:
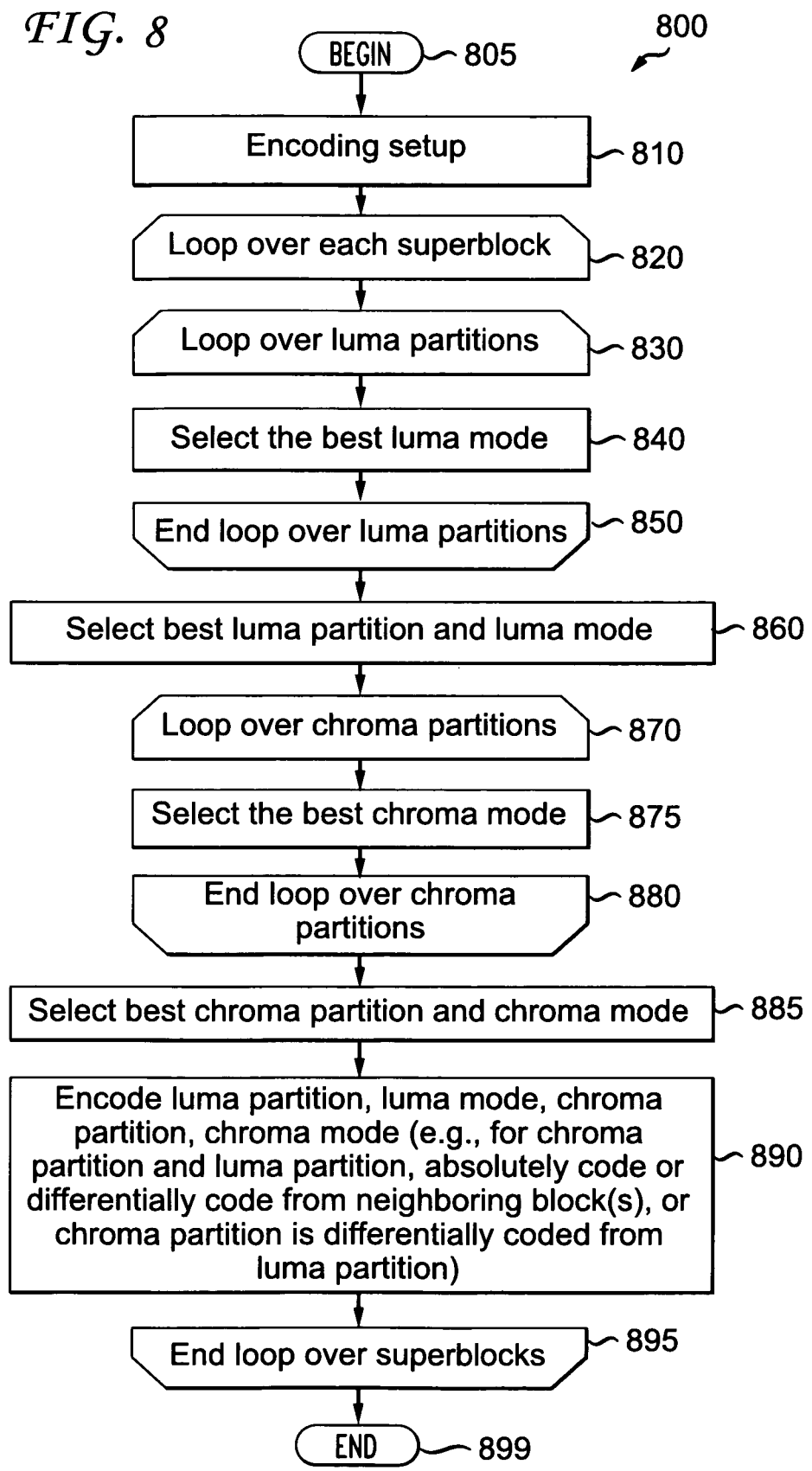
FIG. 8 is a flow diagram showing another exemplary method for intra chroma coding, in accordance with an embodiment of the present principles.

Turning to FIG. 8, another exemplary method for intra chroma coding is indicated generally by the reference numeral 800. The method 800 corresponds to one implementation of Embodiment 2 described above. The method 800 includes a start block 805 that passes control to a function block 810. The function block 810 performs an encoding setup, and passes control to a loop limit block 820. The function block 820 performs a loop over each superblock, and passes control to a loop limit block 830. The loop limit block 830 begins a loop over luma partitions, and passes control to a function block 840. The function block 840 selects the best luma mode (based on, e.g., a rate-distortion cost), and passes control to a loop limit block 850. The loop limit block 850 ends the loop over the luma partitions, and passes control to a function block 860. The function block 860 sets the best luma partition and luma mode (based on, e.g., a rate-distortion cost), and passes control to a loop limit block 870. The loop limit block 870 begins a loop over chroma partitions, and passes control to a function block 875. The function block 875 selects the best chroma mode, and passes control to a loop limit block 880. The loop limit block 880 ends the loop over the chroma partitions, and passes control to a function block 885. The function block 885 sets the best chroma partition and chroma mode, and passes control to a function block 890. The function block 890 encodes the luma partition, the luma mode, the chroma partition, and the chroma mode, and passes control to a loop limit block 895. The loop limit block ends the loop over the superblocks, and passes control to an end block 899. With respect to function block 890, the luma partition and the chroma partition may be absolutely coded or may be differentially coded from one or more neighboring blocks or the chroma partition may be differentially coded from the luma partition.

Turning to FIG. 9, another exemplary method for intra chroma decoding is indicated generally by the reference numeral 900. The method 900 corresponds to one implementation of Embodiment 2 described above. The method 900 includes a start block 905 that passes control to a loop limit block 910. The loop limit block 910 begins a loop over each superblock, and passes control to a function block 920. The function block 920 parses a luma partition, and passes control to a function block 930. The function block 930 parses a luma mode, and passes control to a function block 940. The function block 940 parses a chroma partition, and passes control to a function block 950. The function block 950 parses a chroma mode, and passes control to a function block 960. The function block 960 decodes ones superblock (using the items parsed by function blocks 920, 930, 940, and 950), and passes control to a loop limit block 970. The loop limit block 970 ends the loop over the superblocks, and passes control to an end block 999.

Syntax 2

TABLE 4 shows exemplary macroblock layer syntax for Embodiment 2, in accordance with an embodiment of the present principles.

TABLE 4

| macroblock_layer( ) { | C | Descriptor |
|---|---|---|
| ... | | |
| intra32_flag | 2 | u(1) |
| if (intra32_flag==1) { | | |
|   intra_luma_pred_mode_32 | 2 | ue(v)/se(v) |
| } | | |
| else { | | |
|   for (i16=0; i16<4; i16++) { | | |
|     sip_type_16[i16] | 2 | ue(v)/se(v) |
|     if (sip_type_16[i16]==Luma_16x16) { | | |
|       intra_luma_pred_mode_16[i16] | 2 | ue(v)/se(v) |
|     } | | |
|     else { | | |
|       if (sip_type[i16]==Luma_8x8) { | | |
|         for (i8=0; i8<4; i8++) | | |
|           intra_luma_pred_mode_8[i8] | 2 | ue(v)/se(v) |
|       } | | |
|       else { | | |
|         for (i4=0; i4<16; i4++) | | |
|           intra_luma_pred_mode_4[i4] | 2 | ue(v)/se(v) |
|       } | | |
|     } | | |
|   } | | |
| } | | |
| sip_chroma_type_16 | 2 | ue(v)/se(v) |
| if (sip_chroma_type_16[i16]=Chroma_16x16) { | | |
|   intra_chroma_pred_mode_16 | | |
| } | | |
| else { | | |
|   if (sip_chroma_type_8[i8]==Chroma_8x8) { | | |
|     for (i8=0; i8<4; i8++) | | |
|       intra_chroma_pred_mode_8[i8] | 2 | ue(v)/se(v) |
|   } | | |
|   else { | | |
|     for (i4=0; i4<16; i4++) | | |
|       intra_chroma_pred_mode_4[i4] | 2 | ue(v)/se(v) |
|   } | | |
| } | | |
| ... | | |
| } | | |

The semantics of the syntax elements of TABLE 4 are as follows:

intra32_flag equal to 1 specifies that Luma_32×32 is used for a 32×32 large block. intra32_flag equal to 0 specifies that a 32×32 large block is further split into 16×16 partitions.

intra_luma_pred_mode_32 specifies intra prediction mode for Luma_32×32.

sip_type_16[i] specifies the spatial intra partition type in the $i^{th}$ 16×16 luma block. The spatial intra prediction type can be Luma_16×16, Luma_8×8 and Luma_4×4.

intra_luma_pred_mode_16[i] specifies intra prediction mode for Luma_16×16 for the $i^{th}$ 16×16 luma block.

intra_luma_pred_mode_8[i] specifies intra prediction mode for Luma_8×8 for the $i^{th}$ 8×8 luma block.

intra_luma_pred_mode_4[i] specifies intra prediction mode for Luma_4×4 for the $i^{th}$ 4×4 luma block.

sip_chroma_type_16 specifies the spatial intra partition type in the $i^{th}$ 16×16 chroma block. The spatial intra partition type can be chroma_16×16, chroma_8×8 and chroma_4×4.

intra_chroma_pred_mode_16 specifies intra prediction mode for Chroma_16×16.

intra_chroma_pred_mode_8[i] specifies intra prediction mode for Chroma_8×8 for the $i^{th}$ 8×8 chroma block.

intra_chroma_pred_mode_4[i] specifies intra prediction mode for Chroma_4×4 for the $i^{th}$ 4×4 chroma block.

A description will now be given of some of the many attendant advantages/features of the present invention, some of which have been mentioned above. For example, one advantage/feature is an apparatus having an encoder for encoding picture data for at least a block in a picture. Multiple partition types are supported for intra chroma coding of the block. The multiple partition types include a set of chroma partition types and a set of luma partition types. The set of chroma partition types are different than the set of luma partition types.

Another advantage/feature is the apparatus having the encoder as described above, wherein a particular chroma partition type for coding the block is determined from the set of chroma partition types responsive to a luma partition type utilized to code the block or one or more neighboring blocks, the luma partition type being included in the set of luma partition types.

Yet another advantage/feature is the apparatus having the encoder wherein a particular chroma partition type for coding the block is determined from the set of chroma partition types responsive to a luma partition type utilized to code the block or one or more neighboring blocks, the luma partition type being included in the set of luma partition types as described above, wherein for the particular chroma partition type, a largest-size available transform matching the particular chroma partition type is selected from a set of transforms.

Still another advantage/feature is the apparatus having the encoder wherein a particular chroma partition type for coding the block is determined from the set of chroma partition types responsive to a luma partition type utilized to code the block or one or more neighboring blocks, the luma partition type being included in the set of luma partition types as described above, wherein from among a particular luma partition type and a particular chroma partition type selected to code the block only the particular luma partition type is signaled, the particular luma partition type being selected from the set of luma partition types and the particular chroma partition type being selected from the set of chroma partition types.

A further advantage/feature is the apparatus having the encoder wherein from among a particular luma partition type and a particular chroma partition type selected to code the block only the particular luma partition type is signaled, the particular luma partition type being selected from the set of luma partition types and the particular chroma partition type being selected from the set of chroma partition types as described above, wherein the particular luma partition type is absolutely coded or differentially coded from one or more neighboring blocks.

A yet further advantage/feature is the apparatus having the encoder as described above, wherein a particular chroma partition type used to code the block is determined independently from a particular luma partition type used to code the block, the particular chroma partition type being determined from the set of chroma partition types and the particular luma partition type being determined from the set of luma partition types.

Moreover, another advantage/feature is the apparatus having the encoder wherein a particular chroma partition type used to code the block is determined independently from a particular luma partition type used to code the block, the particular chroma partition type being determined from the set of chroma partition types and the particular luma partition type being determined from the set of luma partition types as described above, wherein the particular chroma partition type and the particular luma partition types are both signaled.

Further, another advantage/feature is the apparatus having the encoder wherein the particular chroma partition type and the particular luma partition types are both signaled as described above, wherein the particular luma partition type and the particular chroma partition type are absolutely coded or differentially coded from one or more neighboring blocks.

Also, another advantage/feature is the apparatus having the encoder wherein the particular chroma partition type and the particular luma partition types are both signaled as described above, wherein the particular chroma partition type is differentially coded from the particular luma partition type.

Additionally, another advantage/feature is the apparatus having the encoder as described above, wherein a chroma entropy coding engine used to code the block is different from a luma entropy coding engine used to code the block.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding picture data for at least a block in a picture, wherein multiple partition types are supported for intra prediction chroma coding of the block, the multiple partition types including a set of multiple chroma partition types of sizes 16×16, 8×8, 4×4 and a set of multiple luma partition types, wherein a particular chroma partition type using a single chroma intra prediction mode, that can be different than luma intra prediction mode, for coding the partitioned block is determined from the set of multiple chroma partition types from a particular luma partition type used to code the block and the particular luma type being determined from the set of luma partition types, and wherein intra luma partition type and chroma partition type are independently coded inside a macroblock on a macroblock basis wherein the luma partition type and chroma partition type are differentially coded from a neighboring block, and wherein chroma uses a same entropy coding engine as luma, or a particular chroma partition type using a single chroma intra prediction mode for coding the partitioned block is determined from the set of chroma partition types in response to a luma partition type utilized to code the block or the blocks of one or more neighboring blocks, the chroma partition type being aligned with luma partition type for a set of partition types and luma partition type is signaled but not chroma partition type, the luma partition type being included in the set of luma partition types.

2. In a video encoder, a method, comprising:
encoding picture data for at least a block in a picture, wherein multiple partition types are supported for intra prediction chroma coding of the block, the multiple partition types including a set of multiple chroma partition types of sizes 16×16, 8×8, 4×4 and a set of multiple luma partition types, wherein a particular chroma partition type using a single chroma intra prediction mode, that can be different than luma intra prediction mode, for coding the partitioned block is determined from the set of multiple chroma partition types from a particular luma partition type used to code the block and the particular luma type being determined from the set of luma partition types, and wherein intra luma partition type and chroma partition type are independently coded inside a macroblock on a macroblock basis wherein the luma partition type and chroma partition type are differentially coded from a neighboring block, and wherein chroma uses a same entropy coding engine as luma, or a particular chroma partition type using a single chroma intra prediction mode for coding the partitioned block is determined from the set of chroma partition types in response to a luma partition type utilized to code the block or the blocks of one or more neighboring blocks, the chroma partition type being aligned with luma partition type for a set of partition types and luma partition type is signaled but not chroma partition type, the luma partition type being included in the set of luma partition types.

3. The method of claim 2, wherein a particular chroma partition type for coding the block is determined from the set of chroma partition types responsive to a luma partition type utilized to code the block or one or more neighboring blocks, the luma partition type being included in the set of luma partition types.

4. The method of claim 3, wherein for the particular chroma partition type, a largest-size available transform matching the particular chroma partition type is selected from a set of transforms.

5. The method of claim 3, wherein from among a particular luma partition type and a particular chroma partition type selected to code the block only the particular luma partition type is signaled, the particular luma partition type being selected from the set of luma partition types and the particular chroma partition type being selected from the set of chroma partition types.

6. The method of claim 5, wherein the particular luma partition type is absolutely coded or differentially coded from one or more neighboring blocks.

7. The method of claim 2, wherein a particular chroma partition type used to code the block is determined independently from a particular luma partition type used to code the block, the particular chroma partition type being determined from the set of chroma partition types and the particular luma partition type being determined from the set of luma partition types.

8. The method of claim 7, wherein the particular chroma partition type and the particular luma partition types are both signaled.

9. The method of claim 8, wherein the particular luma partition type and the particular chroma partition type are absolutely coded or differentially coded from one or more neighboring blocks.

10. The method of claim 8, wherein the particular chroma partition type is differentially coded from the particular luma partition type.

11. An apparatus, comprising:
a decoder for decoding picture data for at least a block in a picture, wherein multiple partition types are supported for intra prediction chroma decoding of the block, the multiple partition types including a set of multiple chroma partition types of sizes 16×16, 8×8, 4×4 and a set of multiple luma partition types, wherein a particular chroma partition type using a single chroma intra prediction mode, that can be different than luma intra prediction mode, for decoding the partitioned block is determined from the set of multiple chroma partition types from a particular luma partition type used to decode the block and the particular luma type being determined from the set of luma partition types, and wherein intra luma partition type and chroma partition type are independently decoded inside a macroblock on a macroblock basis wherein the luma partition type and chroma partition type are differentially coded from a neighboring block, and wherein chroma uses a same entropy decoding engine as luma, or a particular chroma partition type using a single chroma intra prediction mode for decoding the partitioned block is determined from the set of chroma partition types in response to a luma partition type utilized to decode the block or the blocks of one or more neighboring blocks, the chroma partition type being aligned with luma partition type for a set of partition types and luma partition type is signaled but not chroma partition type, the luma partition type being included in the set of luma partition types.

12. In a video decoder, a method, comprising:
decoding picture data for at least a block in a picture, wherein multiple partition types are supported for intra prediction chroma decoding of the block, the multiple partition types including a set of multiple chroma partition types of sizes 16×16, 8×8, 4×4 and a set of multiple luma partition types, wherein a particular chroma partition type using a single chroma intra prediction mode, that can be different than luma intra prediction mode, for decoding the partitioned block is determined from the set of multiple chroma partition types from a particular luma partition type used to decode the block and the particular luma type being determined from the set of luma partition types, and wherein intra luma partition type and chroma partition type are independently decoded inside a macroblock on a macroblock basis wherein the luma partition type and chroma partition type are differentially coded from a neighboring block, and wherein chroma uses a same entropy decoding engine as luma, or a particular chroma partition type using a single chroma intra prediction mode for decoding the partitioned block is determined from the set of chroma partition types in response to a luma partition type utilized to decode the block or the blocks of one or more neighboring blocks, the chroma partition type being aligned with luma partition type for a set of partition types and luma partition type is signaled but not chroma partition type, the luma partition type being included in the set of luma partition types.

13. The method of claim 12, wherein a particular chroma partition type for decoding the block is determined from the set of chroma partition types responsive to a luma partition type utilized to decode the block or one or more neighboring blocks, the luma partition type being included in the set of luma partition types.

14. The method of claim 13, wherein for the particular chroma partition type, a largest-size available transform matching the particular chroma partition type is selected from a set of transforms.

15. The method of claim 13, wherein from among a particular luma partition type and a particular chroma partition type selected to code the block only information indicating the particular luma partition type is received from a corresponding encoder for use in decoding the block, the particular luma partition type being selected from the set of luma partition types and the particular chroma partition type being selected from the set of chroma partition types.

16. The method of claim 15, wherein the particular luma partition type is absolutely decoded or differentially decoded from one or more neighboring blocks.

17. The method of claim 12, wherein a particular chroma partition type used to code the block is determined independently from a particular luma partition type used to code the block, the particular chroma partition type being determined from the set of chroma partition types and the particular luma partition type being determined from the set of luma partition types.

18. The method of claim 17, wherein information indicating both the particular chroma partition type and the particular luma partition types is received from a corresponding encoder for use in decoding the block.

19. The method of claim 18, wherein the particular luma partition type and the particular chroma partition type are absolutely decoded or differentially decoded from one or more neighboring blocks.

20. The method of claim 18, wherein the particular chroma partition type is differentially decoded from the particular luma partition type.

21. A non-transitory computer-readable storage media having video signal data encoded thereupon, comprising:
picture data encoded for at least a block in a picture, wherein multiple partition types are supported for intra prediction chroma coding of the block, the multiple partition types including a set of multiple chroma partition types of sizes 16×16, 8×8, 4×4 and a set of multiple luma partition types, wherein a particular chroma partition type using a single chroma intra prediction mode, that can be different than luma intra prediction mode, for coding the partitioned block is determined from the set of multiple chroma partition types from a particular luma partition type used to code the block and the particular luma type being determined from the set of luma partition types, and wherein intra luma partition type and chroma partition type are independently coded inside a macroblock on a macroblock basis wherein the luma partition type and chroma partition type are differentially coded from a neighboring block, and wherein chroma uses a same entropy coding engine as luma, or a particular chroma partition type using a single chroma intra prediction mode for coding the partitioned block is determined from the set of chroma partition types in response to a luma partition type utilized to code the block or the blocks of one or more neighboring blocks, the chroma partition type being aligned with luma partition type for a set of partition types and luma partition type is signaled but not chroma partition type, the luma partition type being included in the set of luma partition types.

\* \* \* \* \*